United States Patent [19]

Klein

[11] 3,809,936
[45] May 7, 1974

[54] BRUSHLESS GENERATOR
[76] Inventor: Enrique J. Klein, 848 Boyce Ave., Menlo Park, Calif. 94301
[22] Filed: May 18, 1972
[21] Appl. No.: 254,414

[52] U.S. Cl. ............................. 310/171, 310/156
[51] Int. Cl. ......................................... H02k 19/24
[58] Field of Search ............ 310/156, 171, 162, 68, 310/68 D, 254, 258, 214–218, 179, 180, 198, 202, 203; 322/95; 29/596

[56] References Cited
UNITED STATES PATENTS

| 2,488,729 | 11/1949 | Kooyman | 310/156 |
| 3,560,776 | 2/1971 | Kildishev | 310/214 |
| 2,522,233 | 9/1950 | Merrill | 310/156 |
| 2,739,253 | 3/1956 | Plumb | 310/156 |
| 3,505,729 | 4/1970 | Blake | 310/214 |
| 3,408,556 | 10/1968 | Gabor | 322/95 |
| 3,333,330 | 8/1967 | Linkous | 29/596 |
| 3,456,142 | 7/1969 | Larsen | 310/180 |
| 3,324,322 | 6/1967 | Johns | 310/198 |
| 3,235,762 | 2/1966 | Brammero | 310/198 |

FOREIGN PATENTS OR APPLICATIONS

| 859,925 | 1/1961 | Great Britain | 310/171 |

Primary Examiner—R. Skudy

[57] ABSTRACT

Apparatus for indicating velocity of rotation by developing an alternating voltage signal which when rectified provides a unidirectional voltage having a low ripple content and a magnitude proportional to the angular velocity of the rotation. A magnetic rotor mounted on a shaft is driven within a stator including an annular magnetic return path and a number of coils mounted within a constant width non-magnetic gap. The rotor, magnetic return path and coils form a geometrical arrangements such that the electromotive forces induced in each coil upon rotation of the rotor have trapezoidally shaped wave forms. The currents produced by these electromotive forces are summed using a full-wave rectifier circuit to obtain a low ripple DC signal.

14 Claims, 11 Drawing Figures

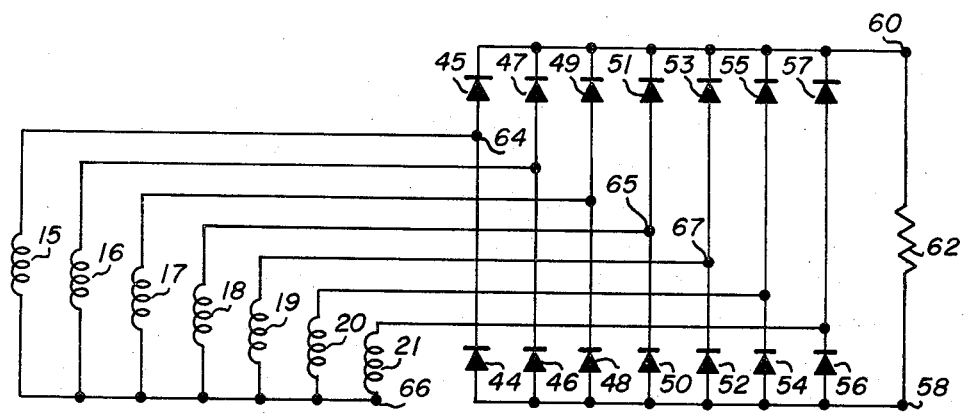
Fig_6
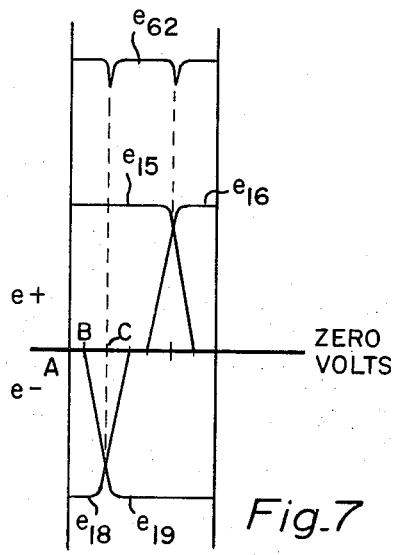
Fig_7
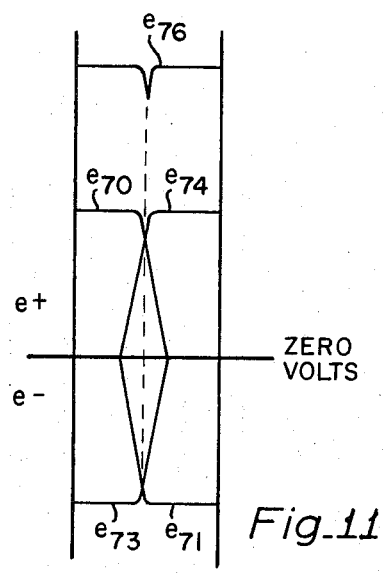
Fig_11
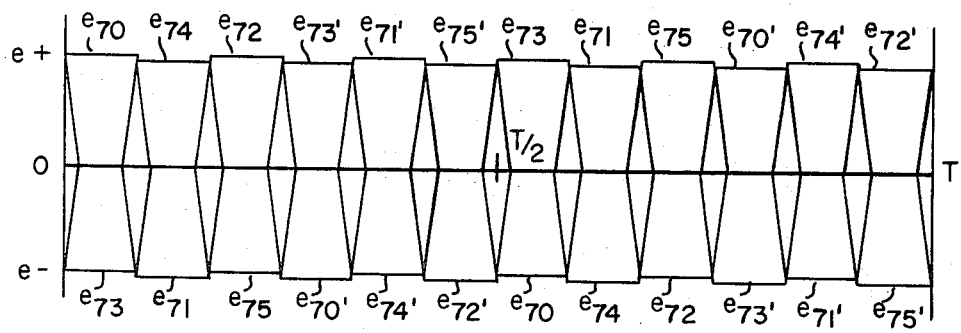
Fig_10

BRUSHLESS GENERATOR

BACKGROUND OF THE INVENTION

1. Field of the Invention

The present invention relates in general to electromagnetic generators and in particular to an improved tachometer for developing a DC signal which is proportional to the angular velocity of a shaft, and has a large output voltage gradient and very low ripple content.

2. Discussion of the Prior Art

Tachometers with a DC signal output are widely used with mechanical and electromechanical machinery. Among their principal applications is the measurement of the angular velocity of the shaft on which they are mounted and the use of their output signals in feedback controls. Conventional DC tachometers incorporating a mechanical commutator, particularly when used in applications requiring the processing of their output signal by electronic circuitry, suffer from a number of drawbacks, such as a DC output signal with relatively large ripple (or noise) components which increase as the tachometer ages, and also the high cost of precision built units. The size of the ripple developed by the commutator action in conventional DC tachometers is the most serious drawback. Most conventional tachometers comprise a variable reluctance magnetic circuit in which the wire coils are wound around protruding poles in the stator or are spaced apart by stator teeth made out of magnetically conductive materials as disclosed by A. Gabor (U.S. Pat. No. 3,408,556) and V. M. Kazansky (U.S. Pat. No. 3,495,114). Although these configurations are designed to enhance the flux conductive characteristics of the magnetic circuit, they adversely affect the waveshape of the electromotive output and make the assembly of the machine more difficult. These pitfalls are avoided in the present invention through the use of a constant reluctance magnetic circuit involving a uniform gap in the magnetic circuit between the rotor and the stator. It is thus apparent that there is a definite need for an improved tachometer of the type to which the present application is directed.

SUMMARY OF THE INVENTION

An object of the present invention is to provide an improved tachometer which develops a voltage output which when rectified is linearly related to the angular velocity of the input shaft.

Another object of this invention is to provide an improved tachometer having a large rectified voltage output gradient relative to the physical size of the device.

Another object of this invention is to provide an improved tachometer for developing an output voltage which when rectified provides a signal with a low voltage ripple under all velocity and electrical loading conditions, even after prolonged use.

Another object of this invention is to provide an improved tachometer which allows for a simplified installation of the coils in the stator.

Yet another object of this invention is to provide an improved tachometer which is simple and compact in construction and suitable for low cost mass production.

Still further objects and advantages will appear in the more detailed descriptions given below.

In accordance with the present invention there is provided a tachometer comprised of a cylindrical casing containing a stator including an annular magnetic return path of constant cross section disposed in surrounding relationship with an air gap in which a number of wire coils are fixedly positioned by a coil holder member, and a freely rotating rotor assembly including a permanent magnet mounted on a single rotary shaft. The geometrical arrangement of the coils with relationship to the poles of the rotor and the annular magnetic return path is such that, in operation, a voltage signal is generated in each coil as each magnetic pole passes thereby. The signals from all the coils are then rectified and summed by electronic means to produce a unidirectional output voltage with a very small voltage ripple.

Preferred forms of the present invention are shown in the accompanying drawings wherein:

IN THE DRAWING

FIG. 6 is a peak detecting rectification and summation circuit as used in accordance with the present invention;

FIG. 7 is a diagram showing a detail of the electromotive force signal crossover from coil to coil for the embodiment of FIG. 1, and the rectified and summed signal when using a peak detecting rectification circuit as shown in FIG. 6.

FIG. 10 is an idealized diagram of the electromotive forces induced in each coil of the FIG. 8 embodiment during one complete revolution of the magnetic rotor;

FIG. 11 is a diagram showing a detail of the electromotive force signal crossover from coil to coil for the embodiment of FIG. 8, and the rectified and summed signal when using a peak detecting rectification circuit as shown in FIG. 6.

DETAILED DESCRIPTION OF THE INVENTION

Figure 1:
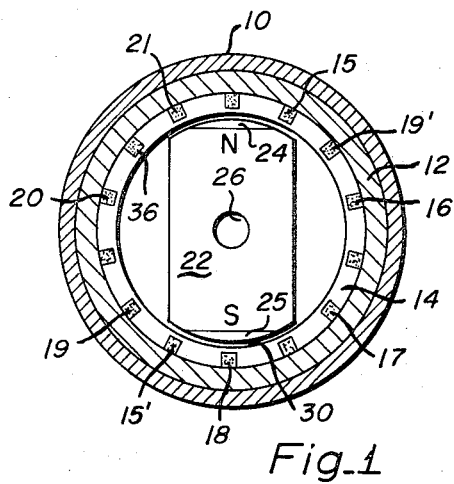
FIG. 1 is an elevational sectioned view of the rotor and stator components of a two-Pole, seven-Coil tachometer with a two-pitch magnetic width in accordance with the present invention.

Reference is now made to FIG. 1 through FIG. 4 of the drawing for a detailed description of the principal parts of this invention, their functions and characteristics of their geometrical arrangement. Reference is made later to FIGS. 5 through 7 for a description of the electrical signals generated by the tachometer and of the rectification and summation process. FIG. 8 through FIG. 11 are referred to in connection with an alternative embodiment of this invention.

FIG. 1 shows an embodiment of the present invention. The stator consists essentially of an outer casing 10, a magnetic return path member 12, a coil holder comprising a cup-shaped non-magnetic member 14 and seven (an odd-numbered plurality) wire coils 15, 16, 17, 18, 19, 20 and 21. The rotor consists essentially of a permanent magnet main body 22 with pole pieces 24 and 25, mounted on a shaft 26. The casing 10 is of a generally hollow cylindrical shape, made out of magnetically non-conductive material, and includes a lid member (not shown) to contain all of the operative parts of the tachometer. The magnetic return path member 12 is of annular shape with a uniform cross section and fits inside casing 10. It can be made up by multiple laminations of a soft magnetic material such as silicon iron, to minimize eddy currents. The coil holder shown more clearly in FIG. 2, comprises two portions, a cup member 14, open on one side and with an end wall on the other, and a lid or closure member 28 which are made out of a non-magnetic material such as a suitable plastic. Cup member 14 is adapted to contain the permanent magnet 22 of the rotor which can turn freely therein when the tachometer is completely assembled having a uniform clearance 30 between the cup 14 and the magnet 22 and pole pieces 24 and 25. The rotor and the coil holder form an assembly when the rotor is inserted into the coil holder, and the lid 28 is joined with the cup member 14 by pushing the ring portion 32 of lid 28 into the cylindrical cavity of cup 14 leaving the rotor captive within the coil holder with only the shaft ends protruding from each side. The coil holder shown in FIGS. 1 and 2 has fourteen slots or grooves 34 running parallel to its axis and distributed evenly around its periphery. These grooves extend along the entire length of the assembled coil holder, including the cup 14 and the lid 28, and leaving a thin web 36 in the region covering the axial length of magnet 22 as shown in FIG. 1. The coil holder assembly containing the rotor is then wound with wire coils 15, 16, 17, 18, 19, 20 and 21. In the embodiment of FIG. 1, the wire bundles of each coil must be placed in diametrically opposed grooves of the coil holder. Thus, for example, the two active wire bundles of coil 15 are the bundles marked 15 and 15' in FIG. 1. The coil holder and rotor assembly lend themselves well for the winding of the coils using automatic winding machinery. The wire can be wound to fill two diametrically opposed grooves in the coil holder, with the hub 38 on cup 14 and a similar hub on the lid 28 (not shown) deflecting the wire away from the shaft 26 of the rotor. The resulting coil is then shaped as shown in FIG. 3 wherein the two active wire bundles are 15 and 15' and the coil has entrance and exit terminal wires 40 and 42 respectively.

Figure 4:
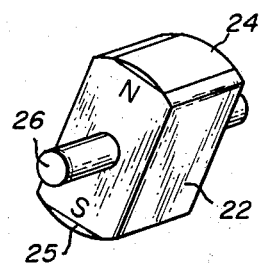
FIG. 4 is a view of a magnetic rotor with flux density compensation pole pieces.
Figure 5:
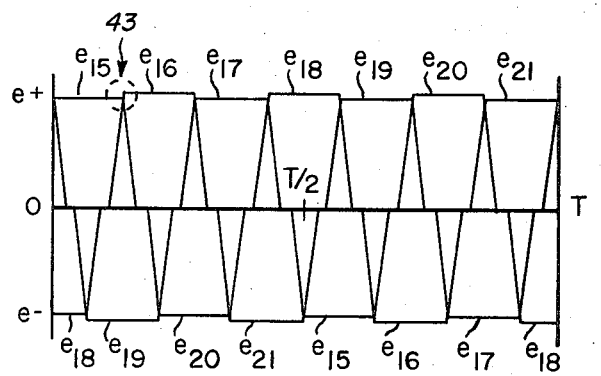
FIG. 5 is an idealized diagram showing the electromotive forces induced in each coil of the FIG. 1 embodiment during one complete revolution of the magnetic rotor.

The rotor of the embodiment of FIG. 1 is also shown separately in FIG. 4. The permanent magnet 22 is made out of a suitable permanent magnetic material such as Alnico V. It is magnetized in a direction normal to the axis of shaft 26 so as to provide a magnetic north pole N at one end and a magnetic south pole S at the other end. The pole pieces 24 and 25, preferably made out of soft magnetic material, such as iron, have the cross section of a circular segment and are affixed to flattened portions of the permanent magnet 22 with a suitable adhesive such as epoxy. Shaft 26 is made out of a non-magnetic material which can turn freely in bearings fixedly attached to the casing 10.

To assemble the tachometer according to the present invention, the coil holder assembly incorporating the rotor and having all the coils wound on it plus a connection board carrying the coil terminals (not shown) is slipped into the magnetic return path member 12, and this second assembly is pushed into the casing 10 making one end of the rotor shaft seat in its bearing. The coil holder, return path member 12 and the casing 10 are then pinned or glued together and the assembly is completed when the lid member of casing 10 is added providing a bearing seat for the second end of the rotor shaft 26.

The physical principle of operation of the present invention is that an electromotive force, or voltage, is induced in the coils by the relative motion between the magnetic fields associated with the rotor and the coils in the stator.

Referring again to FIG. 1, a magnetic flux is established in the magnetic circuit consisting of the permanent magnet 22 with its pole pieces 24 and 25, the non-magnetic gap in which coils 15, 16, 17, 18, 19, 20 and 21 are positioned, and the magnetic return path member 12. When the rotor is in the position shown in FIG. 1, the magnetic flux lines can be considered as leaving the north pole N, then crossing the non-magnetic gap opposite north pole N and bifurcating with half of the flux lines travelling down the left side and the other half travelling down the right side of the magnetic return path member 12, until they meet and cross the gap opposite the south pole S to re-enter the magnet 22, thus completing the magnetic circuit. As the shaft 26 of the tachometer is driven, this magnetic flux pattern rotates with it. As magnet 22 turns, the total magnetic flux remains constant because the air gap between magnet 22 and the return path member 12 does not vary thus forming a constant reluctance magnetic circuit.

Obtaining voltage signals from the coils which produce currents that when rectified and summed provide a uni-directional output signal with a small ripple requires a novel type of geometrical arrangement involving the rotor, the non-magnetic gaps, the coils, and the magnetic return paths. The main features of such a geometrical arrangement will now be described with reference to the embodiment of the invention shown in FIG. 1:

1. A pair of constant volume non-magnetic gaps each defined by the distance between the periphery of a pole of permanent magnet 22 and the magnetic return path member 12, measured along a diameter, times the length of the arc of one of the pole faces, times the axial length of the pole face;

2. An essentially annular shaped magnetic return path member 12 of uniform longitudinal and transverse cross section;

3. Multiturn wire coils, with two bundles of each coil aligned parallel to the rotor shaft constituting the active portions of the coil. These active portions are at least as long as the axial length of the magnet member 22 and return path member 12. The wire bundles in the active portions are positioned within the non-magnetic gap in slots or grooves of approximately rectangular cross section;

4. The coils are arranged within the non-magnetic gap so that the active portions of any one coil are located diametrically opposite each other, as for example wire bundles 15 and 15'. The angular pitch between any two adjacent bundles within the non-magnetic gap equals an angle of 360°/2n where n is the number of coils used in the particular embodiment, where n is reserved for an odd number of coils, e.g., 7 in FIG. 1;

5. The angle subtended by each pole face of the two-pole magnet in the plane of the drawing of FIG. 1 is approximately equal to twice the angular pitch between adjacent wire bundles as described in No. 4, or 360°/n. The angular pitch between the first active bundle of one coil and the first active bundle of the next is 360°/n with a second active bundle of another coil positioned in between. Thus for example, between the first active bundles of coils 15 and 16, i.e. bundles 15 and 16, lies the second active bundle of coil 19, i.e. bundle 19';

6. All coils are wound in the same direction so that the corresponding terminals, e.g. entrace terminals, will assume the same sign under the influence of a given polarity of the magnet travelling in a given sense.

To facilitate the analysis of the electromotive forces induced in the coils by the passage of the magnetic rotor, the following set of conventions will be used:

a. Currents flowing clockwise in a coil, when viewed from inside the coil, are generated by a positive electromotive force, and vice-versa, currents flowing anti-clockwise are generated by a negative electromotive force;

b. Magnetic flux lines radiate outward from a north pole, and inward at a south pole;

c. The magnetic rotor is driven at a steady angular velocity in a clockwise direction.

A useful simplifying assumption is to neglect the leakage and fringing flux from the permanent magnet. This permits visualizing a sharply defined magnetic flux across the magnetic gaps no wider than the pole width itself.

Having thus defined a set of conventions and in view of the above assumptions, it is possible to analyze the electromotive forces induced in the coils by the motion of the magnetic rotor. This is done for one complete revolution of the magnetic rotor, as shown in FIG. 5, to demonstrate the wave shape and phasing of the electromotive forces induced in each coil for the embodiment in FIG. 1. The description of the rectification and summation process is completed by showing a rectification circuit in FIG. 6 using semiconductors and explaining the characteristics of an electromotive force signal crossover from coil to coil as well as the signal summation process as shown in FIG. 7.

Using the above conventions and assumptions together with Fleming's right-hand rule, an idealized diagram of the electromotive forces induced in each coil can be drawn. Following the clockwise sense of rotation of the magnetic north pole from its position as shown in FIG. 1, it can be seen that as its leading edge has already covered bundle 15 and as it continues its rotation, a positive electromotive force of maximum amplitude is induced in bundle 15. This maximum electromotive force remains constant until the trailing edge of the magnetic north pole reaches the entrance side of bundle 15. As the rotor continues its rotation, the electromotive force induced in bundle 15 dimishes until it reaches zero when the trailing edge of the north pole reaches the exit side of bundle 15. When at the same time following the clockwise rotation of the magnetic south pole from its initial position as shown in FIG. 1, it becomes clear that the same process occurs with bundle 15' so that with a clockwise rotation of a magnetic south pole and bundle 15' being part of coil 15, the electromotive forces induced in bundles 15 and 15' are summed within coil 15 to produce a positive signal $e_{15}$. Meanwhile, as the leading edge of north pole N reaches the entrance edge of bundle 19' and simultaneously the leading edge of south pole S reaches the entrance edge of bundle 19 of coil 19, and the magnetic rotor continues its rotation, a negative electromotive force of negatively increasing amplitude is induced in coil 19. This electromotive force attains maximum amplitude $e_{19}$ when the leading edges of the poles reach the exit sides of bundles 19 and 19', respectively, and then remains constant until the trailing edges of the magnet reach the entrance sides of bundles 19 and 19'. As the poles continue their rotation, the electromotive force induced in coil 19 diminishes in amplitude until it reaches zero when the trailing edge of the poles reach the exit sides of bundles 19 and 19'. Upon following the rotation of the magnetic rotor over one revolution from time 0 to time T (one period), the idealized diagram of the electromotive forces induced in each coil appears as shown in FIG. 5. The shape of both the positive and the negative branches of the electromotive force signals from each coil are shown as trapezoids. The flat top of each of the signals is a good approximation to experimental results when the magnetic return path ring 12 in FIG. 1, is made from iron laminations to minimize the waveshape distortion caused by eddy currents in the axial direction within the return path, and when the magnet poles are compensated to provide a constant magnetic flux density by the use of pole pieces 24 and 25 as shown in FIG. 4. A very good compensation of the magnetic flux density can be achieved by flattening the pole faces in planes perpendicular to all flat sides of the permanent magnet rotor 22 and replacing the removed volume of permanent magnet material with pole pieces 24 and 25 made out of soft magnetic material such as iron. The depth to which the pole faces are flattened originally, however, is critical since insufficient pole piece depth will cause electromotive signals to be developed which have outwardly rounded tops. On the other hand, excessive pole piece depth will cause signals to be developed which are concave inwardly at the center. The optimum depth will be determined empirically for a given magnetic circuit configuration.

The sides of the trapezoid will not be straight in practice due to the magnetic leakage flux and the fringing flux from the permanent magnet rotor 22 to the magnetic return path member 12. However, this will not affect the smoothness of the output signal as long as a peak detecting rectification scheme is used which will only rectify and sum the flat tops of the trapezoidal signals. It is, therefore, important that consecutive trapezoidal waves intersect close to their shoulders, as shown by 43 in FIG. 5. The trapezoidal signals in FIG. 5 are shown with slightly different amplitudes only to distinguish them from each other. The width of the flat tops can be altered without affecting the phase relationship by changing the width of the magnet poles with respect to twice the angular pitch of the wire bundles.

A number of summation and rectification schemes involving electronic circuitry can be used to obtain a uni-directional output voltage. For the device of FIG. 1, a "star" configured, seven-phase full-wave peak detecting circuit can be used. This circuit is shown in FIG.

6 and consists of the seven coils 15, 16, 17, 18, 19, 20 and 21 in a star configuration and an array of 7 diode pairs, with diodes 44 through 57, having terminals 58 and 60 connected across a constant external load 62. With the electromotive force signals from each coil as given in FIG. 5, it is possible to determine the voltage signals across load 62 at the terminals 58 and 60 in the circuit of FIG. 6. The rectification and summation process is described with the help of FIG. 7, which shows a detail of FIG. 5 corresponding to the electromotive force signal crossovers $e_{18}$ to $e_{19}$ and $e_{15}$ to $e_{16}$. At time A, the signal from coil 15 is maximum with terminal 64 positive and the signal from coil 18 is maximum with terminal 65 negative. Thus the current path will be from terminal 64 through diode 45, load 62, diode 50, terminal 65, coil 18, terminal 66 and back to terminal 64 through coil 15, with the electromotive force across terminals 58 and 60 being the sum of the absolute values of $e_{15}$ and $e_{18}$ as given by curve $e_{62}$. Between times B and C, $e_{15}$ remains unchanged, $e_{18}$ starts to decrease in absolute value, and $e_{19}$ starts to increase in absolute value making terminal 67 negative too. The current path will, however, remain unchanged since diode 52 will not conduct as long as terminal 65 is more negative than terminal 67. When the crossover between $e_{18}$ and $e_{19}$ happens at time C, then diode 52 will conduct and diode 50 will stop conducting. Thus, the circuit of FIG. 7 acts as a peak detecting circuit and the resulting electromotive force across terminals 58 and 60 is as shown by $e_{62}$. The same is true for the crossover from $e_{15}$ to $e_{16}$ and all the other crossovers shown in FIG. 5.

It is important to note that the output voltage across terminals 58 and 60 will be substantially free of ripple when the peaks of the electromotive force signals are flat and of equal amplitude, when the crossover occurs close to these peaks, and when the angular spacing of the coils is uniform. The ripple is not affected by the slope of the electromotive force signals at their leading and trailing edges. It is also of interest that the ripple for the tachometer configuration of FIG. 1 is equal to twice the number of coils, in pulses per revolution. The output of the tachometer and circuit combination according to the present invention is of the same sign irrespective of whether the rotor turns in a clockwise or counterclockwise direction.

For a given geometrical arrangement of the tachometer and a constant magnetic flux density across the non-magnetic gap, the zero to peak electromotive forces induced in each coil will be proportional to the velocity at which the magnetic lines cut through the coils. Considering this together with the characteristics of the rectification and summation circuit of FIG. 6, the output voltage will be a linear function of the rotational speed or angular velocity of the tachometer drive shaft 26, but the forward bias voltage of the diodes will cause a small constant shift in the output voltage signal and a discontinuity near zero angular velocity.

A variety of embodiments of this invention can be designed involving different numbers of coils, magnetic pole pairs, and magnet pole widths corresponding to one or more angular pitches between adjacent wire bundles. For a geometrical arrangement comprising an odd number of coils, and a two pole magnetic rotor, with the pole width covering two times the angular pitch from wire bundle to wire bundle, as in the embodiment of FIG. 1, the number of coils can be chosen as three, five, seven, nine, etc.

An alternative embodiment of the present invention consisting of an even number of coils and a two pole magnetic rotor, with the pole width covering one angular pitch from wire bundle to wire bundle, will be described in connection with FIG. 8 through FIG. 11.

Figure 2:
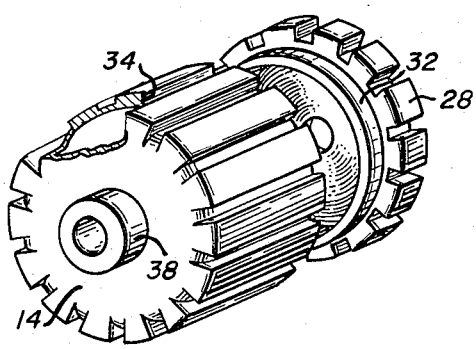
FIG. 2 is an exploded view of a coil holder adapted for external coil winding.
Figure 3:
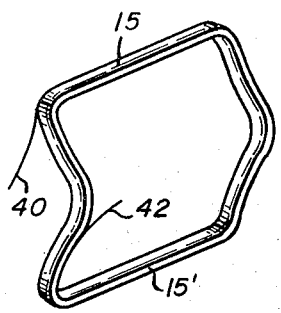
FIG. 3 is a view of one of the wire coils as wound on a coil holder such as shown in FIG. 2, for a tachometer having an odd number of coils.
Figure 9:
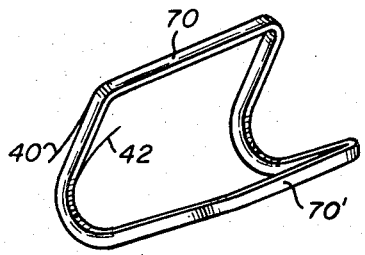
FIG. 9 is a view of one of the wire coils as wound on a coil holder such as shown in FIG. 2, for a tachometer having an even number of coils.
Figure 8:
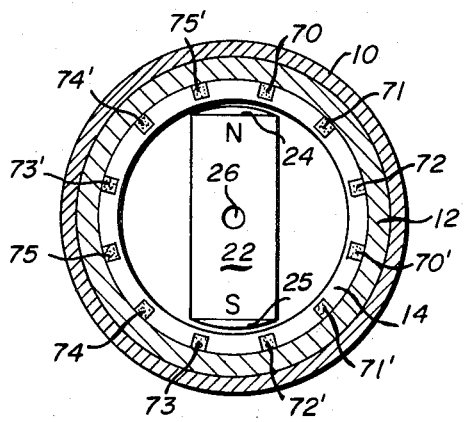
FIG. 8 is an elevational sectional view of the rotor and stator components of a two-Pole, six-Coil tachometer with a one-pitch magnet width.

In FIG. 8 the casing 10, magnetic return path member 12, cup-shaped non-magnetic) coil holder 14, permanent magnet 22, pole pieces 24 and 25, and shaft 26 are essentially correspondent to the equally numbered members described for the first embodiment as shown in FIGS. 1, 2 and 4. The principal difference between the two embodiments lies in the distribution and arrangement of the coils. In the embodiment of FIG. 8, an even-numbered plurality of coils 70, 71, 72, 73, 74 and 75 are wound so that the two active wire bundles of each coil are placed in slots or grooves three angular pitches apart. Thus, for example, the two active wire bundles of coil 70 are the bundles marked 70 and 70' in FIG. 8. When winding such a coil on a coil holder as in FIG. 2 but having twelve instead of fourteen slots or grooves equally spaced around its periphery, the wire is wound into the grooves 34 and around the hubs 38 resulting in a coil shape as in FIG. 9, which shows the wire bundles 70 and 70' as well as the entrance and exit terminals 40 and 42.

Referring back to the six main features of the geometrical arrangement as described for the embodiment of FIG. 1, the first three features apply equally to the embodiment of FIG. 8. Features 4, 5, and 6 are replaced by:

4'. The coils are arranged within the non-magnetic gap so that the first wire bundle of the first coil is located diametrically opposite to the first wire bundle of coil number $(m/2)+1$ where $m$ is the even number of coils used in the particular embodiment, i.e., 6 in FIG. 8. Thus for example, bundle 70 is diametrically opposite to bundle 73. This leads to an arrangement wherein the sequence of the active wire bundles around the periphery of the coil holder is $1, 2, \ldots, m/2$ followed by $1', 2', \ldots, m'/2$ followed by $(m/2)+1, (m/2)+2, \ldots, m$ followed by $(m'/2)+1, (m'/2)+2, \ldots, m'$. The primed numbers refer to the second active wire bundles in each coil. Thus for the embodiment of FIG. 8, the sequence is 70, 71, 72, 70', 71', 72', 73, 74, 75, 73', 74', 75'. The angular pitch between any two adjacent wire bundles within the non-magnetic gap is $360°/2m$. The angular pitch between the first and the second active bundles of any one coil is 90°.

5'. The angle subtended by each pole face of the two-pole magnet in the plane of the drawing of FIG. 8 is approximately equal to the angular pitch between adjacent wire bundles, or $360°/2m$, as described in No. 4'.

6'. The first half of the coils, up to coil $m/2$, are wound in alternating directions and the second half of the coils up to coil $m$ are also wound in alternating directions with the direction of coil 1 being the same as that of coil $(m/2)+1$. With this arrangement, the sequence of signals from the coils will be alternating between positive and negative under the influence of a given polarity of the magnet travelling in a given sense.

Using the same conventions for this alternative embodiment as for the embodiment of FIG. 1 in the analysis of the electromotive forces induced in the coils by the passage of the magnetic rotor, the wave shape and phasing for one complete revolution of the rotor result as shown in FIG. 10. The principal differences between the signals for this case and those in FIG. 5 are that in FIG. 10 each trapezoidal electromotive force signal is generated by one active wire bundle and not by the two active bundles of the coil, and that all the signal crossovers, both positive and negative, occur in equal phase since the magnet pole width corresponds to one angular pitch from wire bundle to wire bundle. The signal rectification and summation can be done in a rectification circuit similar to that shown in FIG. 6 having the coils connected with their corresponding terminals, i.e. entrance terminals and exit terminals, as in FIG. 6 but with the coils wound in alternating directions as indicated in Paragraph 6'. The rectification and summation process is again similar to that of the first embodiment as described in relation to FIG. 7. FIG. 11 shows a detail of FIG. 10 with the electromotive force signal crossovers $e_{70}$ to $e_{74}$ and $e_{73}$ to $e_{71}$. The output voltage $e_{76}$ across the terminals of the circuit will again correspond to the sum of the absolute values of $e_{70}$ and $e_{73}$, and $e_{74}$ and $e_{71}$ without interference from the portions of the signals that fall between the abscissa and the crossover points. The ripple for the tachometer configuration of FIG. 8 is equal to twice the number of coils, in pulses per revolution.

For a geometrical arrangement comprising an even number of coils, and a two-pole magnetic rotor, with the pole width covering one angular pitch from wire bundle to wire bundle, as in the embodiment of FIG. 8, the number of coils $m$ must be such that dividing by two results in an odd number 9, therefore, $m = 6, 10, 14$ etc. This is necessary to assure that the sign sequence of the electromotive force signals from each wire bundle conforms to the rule of Paragraph 6'.

Yet another alternative embodiment of the present invention consists of an even number of coils and a two-pole magnetic rotor, with the pole width covering two angular pitches from wire bundle to wire bundle. For the case of a six-coil tachometer according to this embodiment, with the coil distribution as that shown in FIG. 8, the electromotive forces induced will have a shape and phase relationship as shown in FIG. 5 provided that the equivalents of coils 70 through 75 are connected serially in pairs: 70 with 73, 71 with 74, and 72 with 75, with the corresponding terminals of coils 70, 71 and 72 connected to the opposite terminals of coils 73, 74, and 75, respectively, while maintaining the same winding direction of the rule of Paragraph 6'. The ripple of the output signal for this embodiment is again equal to twice the number of coils, in pulses per revolution.

An alternative arrangement of the components of this invention would consist of stationarily fixing the casing 10, the magnetic return path member 12 and the magnetic rotor, while driving the coils in coil holder 14 through an annular air gap between these stationary members. The coils would then form part of a cup-shaped rotor attached to a drive shaft. When the miniaturized electronic rectification circuit is incorporated into the cup-shaped rotor, the output signal can be extracted using two slip rings.

Similarly, the magnetic rotor could be fixed relative to the outer casing 10, and the coils together with the magnetic return path member 12 could be made to rotate about the magnetic rotor within member 10.

While several forms of this invention have been disclosed in detail, it is understood that this description is given by way of illustration and explanation only, and not by way of limitation, since various changes therein may be made by those skilled in the art without departing from the scope and spirit of the invention.

Having thus described the invention, what is claimed is:

1. A brushless tachometer generator, comprising:
    an annular magnetic member having a smooth cylindrical inner surface of a first diameter;
    a rotor disposed along the longitudinal axis of said annular member and including a pair of oppositely polarized magnetic poles terminating in pole faces shaped as cylindrical segments which are concentric with said inner surface and have a second diameter smaller than said first diameter, the sector angle of each of said segments being substantially equivalent to an angle of $360°/n$, the space separating said inner surface and said pole faces forming an annular gap of uniform radial dimension;
    an odd-numbered plurality of electrically conductive coils, each comprising a pair of elongated wire bundles disposed within said gap and lying in parallel relationship with said axis, the respective bundles of each coil being disposed on opposite sides of said axis and lying in planes including said axis, adjacent ones of said bundles being angularly positioned about said axis at intervals of $180°/n$, wherein n is the number of coils;
    a cup-shaped non-magnetic member having cylindrical walls with an outer diameter smaller than said first diameter and an inner diameter larger than said second diameter, said walls having slots provided in the outer surface thereof for receiving said wire bundles; and
    semiconductor rectifying means coupled to said coils for converting the electromotive force developed in said coils into a uni-directional electric potential of magnitude proportional to the rotational speed of said rotor.

2. A brushless tachometer generator as recited in claim 1 wherein said magnetic poles include a main body of permanent magnet material and pole pieces of magnetically soft material affixed to said main body to form at least a portion of said pole faces.

3. A brushless tachometer generator as recited in claim 2 wherein said pole pieces have a transverse cross section in the shape of a segment of a circle.

4. A brushless tachometer generator as recited in claim 1 wherein said cup-shaped member is open at one end and is closed at the opposite end by an end wall having an aperture for receiving a shaft supporting said rotor.

5. A brushless tachometer generator as recited in claim 1 and further comprising a coil holder including an annular non-magnetic member disposed within said gap and having an outer diameter smaller than said first diameter and an inner diameter larger than said second diameter, said member having longitudinal slots provided therein for receiving said wire bundles.

6. A brushless tachometer generator as recited in claim 5 wherein said coil holder further includes at least one lid member mating with one end of said annular member and having a central opening provided therein through which the shaft supporting said rotor is passed.

7. A brushless tachometer generator as recited in claim 1 wherein said rectifying means comprise peak detecting means including a plurality of parallel connected diode pairs and wherein all of said coils are wound in the same direction with corresponding entrance terminals of each coil being connected in common, the exit terminal of the various ones of said coils being coupled to various ones of said diode pairs.

8. A brushless tachometer generator, comprising:
a magnetic member having a cylindrical inner surface of a first diameter;
a permanent magnet rotor disposed concentrically with and rotatable about the axis of said magnetic member, said rotor having a pair of oppositely polarized magnetic poles terminating in pole faces shaped as cylindrical segments which have a second diameter smaller than said first diameter, said segments spanning an angle of substantially $180°/m$ as measured about said axis;
an even-numbered plurality of electrically conducting coils, each comprising a pair of elongated wire bundles disposed within the gap defined by said inner surfaces and said pole faces, the respective bundles of each coil being spaced apart by a radial angle of 90°, adjacent ones of said wire bundles being positioned about said axis at intervals of $180°/m$, wherein m is the number of coils and is equal to $2q$ where $q$ is an odd number;
a cup-shaped member of non-magnetic material having cylindrical walls with an outer diameter smaller than said first diameter and an inner diameter larger than said second diameter, said walls having slots provided in a surface thereof for receiving said wire bundles; and
semiconductor rectifying means coupled to said coils for converting the electromotive forces developed therein into an output voltage linearly related to the rotational speed of said rotor.

9. A brushless tachometer generator as recited in claim 8 wherein said cup-shaped member is open at one end and is closed at the opposite end by an end wall having an aperture for receiving the shaft supporting said rotor.

10. A brushless tachometer generator as recited in claim 9 and further comprising a closure member for mating with said one end, said closure member having an aperture for receiving the opposite end of the shaft supporting said rotor.

11. A brushless tachometer generator as recited in claim 8 wherein the first $m/2$ coils are positioned in sequence around said gap with each of said first $m/2$ coils having a first coil bundle in the first quadrant and a second coil bundle in the second quadrant, and the second $m/2$ coils are positioned in sequence around said gap with each of said second $m/2$ coils having a first coil bundle in the third quadrant and a second coil bundle in the fourth quadrant.

12. A brushless tachometer generator as recited in claim 11 wherein the first $m/2$ coils are wound in alternating directions and the second $m/2$ coils are also wound in alternating directions, the first coil in said first and second $m/2$ coils being wound in the same direction.

13. A brushless tachometer generator as recited in claim 8 wherein said magnetic poles include a main body of permanent magnet material and pole pieces of magnetically soft material affixed to said main body to form at least a portion of said pole faces.

14. A brushless tachometer generator as recited in claim 13 wherein said pole pieces have a transverse cross section in the shape of a segment of a circle.

* * * * *

PO-1050
(5/69)

UNITED STATES PATENT OFFICE
CERTIFICATE OF CORRECTION

Patent No. 3,809,936                           Dated  May 7, 1974

Inventor(s)  Enrique J. Klein

It is certified that error appears in the above-identified patent and that said Letters Patent are hereby corrected as shown below:

Title page, item (76), after Boyce Ave., insert --Palo Alto-- and delete "Menlo Park"

Column 5, line 17, "entrace" should read -- entrance--

Column 8, line 7, after "non-magnetic", delete --)--

Column 9, line 31, "odd number 9" should read --odd number q--

Signed and sealed this 1st day of October 1974.

(SEAL)
Attest:

McCOY M. GIBSON JR.
Attesting Officer

C. MARSHALL DANN
Commissioner of Patents